United States Patent
Klimesch et al.

(10) Patent No.: US 9,662,996 B2
(45) Date of Patent: May 30, 2017

(54) METHOD FOR DETERMINING THE REMAINING RANGE OF A MOTOR VEHICLE, AND MOTOR VEHICLE

(75) Inventors: Michael Klimesch, Ingolstadt (DE); Andreas Lamprecht, Neuberg a.d. Donau (DE); Sascha Kulnick, Buxheim (DE)

(73) Assignee: AUDI AG, Ingolstadt (DE)

(*) Notice: Subject to any disclaimer, the term of this patent is extended or adjusted under 35 U.S.C. 154(b) by 382 days.

(21) Appl. No.: 14/233,190

(22) PCT Filed: May 16, 2012

(86) PCT No.: PCT/EP2012/002092
§ 371 (c)(1),
(2), (4) Date: Apr. 11, 2014

(87) PCT Pub. No.: WO2013/010604
PCT Pub. Date: Jan. 24, 2013

(65) Prior Publication Data
US 2014/0229095 A1    Aug. 14, 2014

(30) Foreign Application Priority Data
Jul. 16, 2011   (DE) .................. 10 2011 107 818

(51) Int. Cl.
*G06F 19/00* (2011.01)
*G06G 7/70* (2006.01)
(Continued)

(52) U.S. Cl.
CPC ...... *B60L 11/1861* (2013.01); *B60R 16/0236* (2013.01); *B60L 2240/62* (2013.01);
(Continued)

(58) Field of Classification Search
CPC .................... B60L 2260/52; B60L 2260/54
(Continued)

(56) References Cited

U.S. PATENT DOCUMENTS 5,487,002 A * 1/1996 Diller ................. B60L 11/1861
                                                       320/128
9,043,262 B2 * 5/2015 Sera .................... B60L 11/1861
                                                        706/46
(Continued)

FOREIGN PATENT DOCUMENTS

CN    101879866    11/2010
CN    201872619    6/2011
(Continued)

OTHER PUBLICATIONS

Chinese Office Action for related Chinese Patent Application No. 201280044797.4, issued Aug. 27, 2015, 11 pages.
(Continued)

*Primary Examiner* — Khoi Tran
*Assistant Examiner* — Harry Oh
(74) *Attorney, Agent, or Firm* — Staas & Halsey LLP

(57) ABSTRACT

A method determines the remaining range of a motor vehicle which has an energy store for an electric motor drive which acts the wheels of the motor vehicle. Consumption values which describe the current consumption of the drive and of a secondary consumer are determined using a sensor. A drive prediction value which is assigned to the drive and describes the consumption over a predetermined distance is determined from the consumption values of the drive. A secondary consumption prediction value which is assigned to the secondary consumers and describes the consumption over a predetermined distance is determined separately from the consumption values of the secondary consumers, and the remaining range is determined for a distance which is to be travelled by the motor vehicle and is described by the route data, by taking into account the drive prediction value and the secondary consumption prediction value.

19 Claims, 2 Drawing Sheets

(51) Int. Cl.
   *G06G 7/76* (2006.01)
   *B60L 11/18* (2006.01)
   *B60R 16/023* (2006.01)

(52) U.S. Cl.
   CPC ....... *B60L 2260/52* (2013.01); *B60L 2260/54* (2013.01); *Y02T 10/7258* (2013.01); *Y02T 10/7291* (2013.01); *Y02T 90/16* (2013.01); *Y02T 90/162* (2013.01)

(58) Field of Classification Search
   USPC .......................................................... 701/123
   See application file for complete search history.

(56) References Cited

U.S. PATENT DOCUMENTS

| | | | |
|---|---|---|---|
| 2001/0021885 A1* | 9/2001 | Schulke | B60G 17/0185 |
| | | | 701/1 |
| 2007/0129878 A1* | 6/2007 | Pepper | B60W 40/12 |
| | | | 701/123 |
| 2007/0159392 A1* | 7/2007 | Vallot | G01R 29/26 |
| | | | 342/418 |
| 2010/0121590 A1* | 5/2010 | Kato | B60L 11/14 |
| | | | 702/63 |
| 2010/0138142 A1 | 6/2010 | Pease | |
| 2010/0219945 A1 | 9/2010 | Schumann et al. | |
| 2011/0112710 A1 | 5/2011 | Meyer-Ebeling et al. | |
| 2011/0130939 A1* | 6/2011 | Hartmann | B60W 10/02 |
| | | | 701/93 |
| 2011/0278920 A1* | 11/2011 | Sakamoto | B60L 1/00 |
| | | | 307/10.1 |
| 2012/0123618 A1* | 5/2012 | Kinser | B60L 11/14 |
| | | | 701/22 |
| 2012/0191279 A1* | 7/2012 | Wippler | B60L 15/2045 |
| | | | 701/22 |

FOREIGN PATENT DOCUMENTS

| | | |
|---|---|---|
| DE | 10302504 | 9/2004 |
| DE | 102008030566 | 12/2009 |
| DE | 102008037574 | 7/2010 |
| DE | 102009011015 | 9/2010 |
| DE | 102010007851 | 12/2010 |
| DE | 102010019761 | 12/2010 |
| DE | 102010010620 | 1/2011 |
| DE | 102009052853 | 5/2011 |
| DE | 102011107818.9 | 7/2011 |
| WO | PCT/EP2012/002092 | 5/2012 |

OTHER PUBLICATIONS

English language International Search Report for PCT/EP2012/002092, mailed Oct. 9, 2013, 2 pages.
German Office Action for German Priority Patent Application No. 10 2011 107 818.9, issued Mar. 13, 2012.
WIPO English language translation of the International Preliminary Report on Patentability for PCT/EP2012/002092, mailed May 30, 2014, 9 pages.
Office Action mailed May 17, 2016 in Chinese Patent Application No. 201280044797.4.
Chinese Office Action issued on Nov. 7, 2016 in corresponding Chinese Patent Application No. 201280044797.4.

* cited by examiner

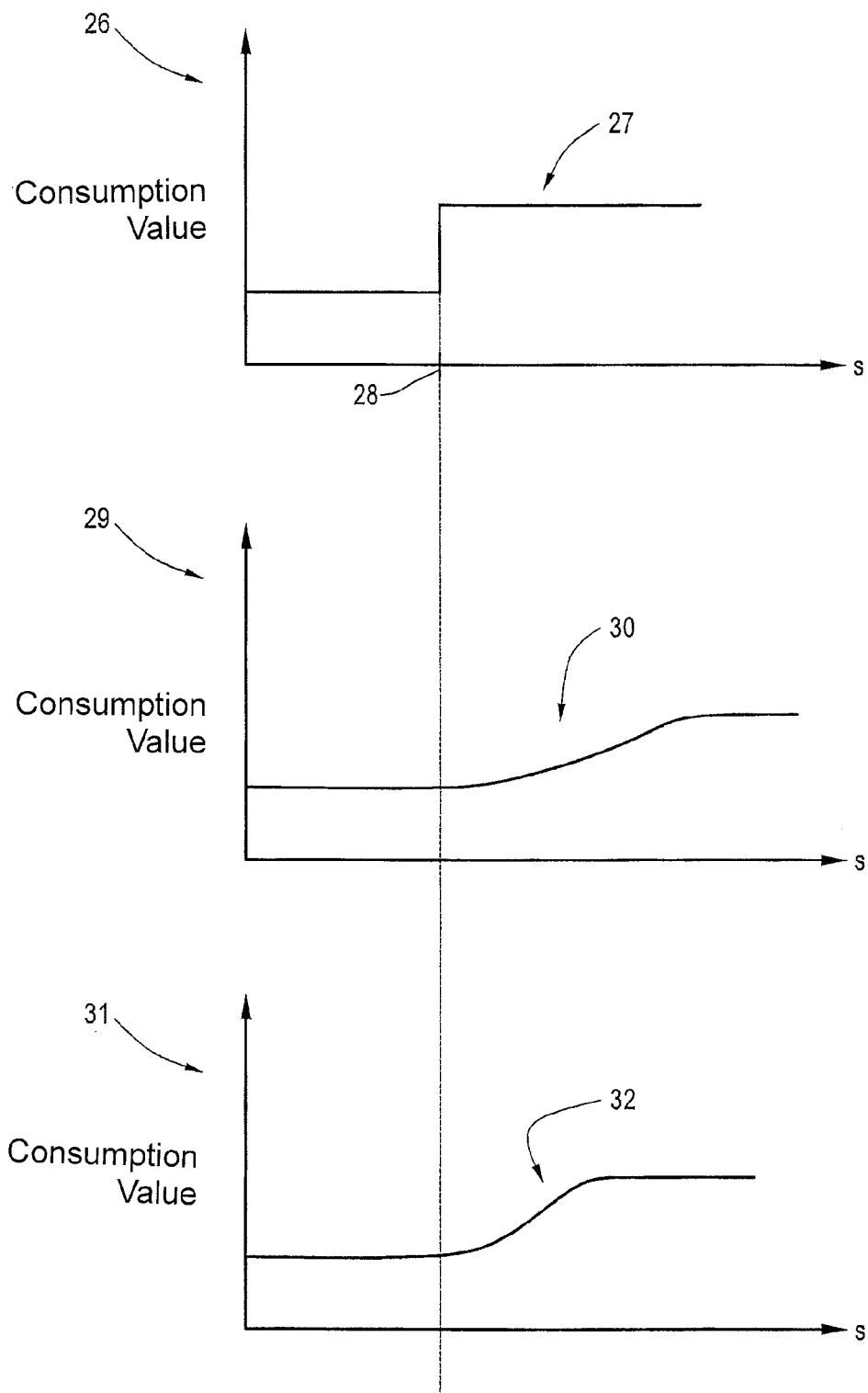

METHOD FOR DETERMINING THE REMAINING RANGE OF A MOTOR VEHICLE, AND MOTOR VEHICLE

CROSS REFERENCE TO RELATED APPLICATIONS

This application is based on and hereby claims priority to International Application No. PCT/EP2012/002092 filed on May 16, 2012 and German Application No. 10 2011 107 818.9 filed on Jul. 16, 2011, the contents of which are hereby incorporated by reference.

BACKGROUND

The invention relates to a method for determining the residual range of a motor vehicle which has an energy store for a drive which acts on at least one wheel of the motor vehicle and has an electric motor, as a function of residual energy in the energy store, and a motor vehicle.

Methods for automatically determining a residual range within a motor vehicle have already been known for a relatively long time. In this context, there is very frequently interaction with a navigation system which supplies route data about routes which will be traveled on in future by the motor vehicle. As a function of consumption observations it is then possible to predict how high the consumption will be on the various future route sections, with the result that if the residual energy is known it is possible to determine how far the motor vehicle can still travel on such a route. This can be displayed to a driver, in particular when the driver wishes to assess whether he can still end his journey without refueling or recharging energy in some other way, and in extended cases also whether the residual energy is even still sufficient for a return journey on the same route. In addition, range calculation methods are known which also check various possible future routes.

A method for determining a residual distance which can be covered and an associated arrangement are disclosed by DE 199 29 426 A1. In this context, it is assumed that there is an internal combustion engine, with the result that the residual energy corresponds to a fuel supply. The residual distance which can be covered with the fuel supply is determined from the quantity of the fuel supply and a determined fuel consumption, wherein situation-dependent consumption mean values are used. The core idea in said document is to determine road-class-dependent consumption mean values. Checking is then performed as to which class of road a route section is associated with, with the result that if the length thereof is known, consumption for the route section can be predicted as a function of the consumption mean values. Further classifications are also proposed in said document, for example for the state of charge of the vehicle, the positive gradient and/or a negative gradient of a route section and the like.

New drive concepts have recently been proposed for series production. The drive of the motor vehicle here has an electric motor which can be fed, for example, from a high voltage battery of the motor vehicle. Motor vehicles which have only at least one electric motor and which are frequently also referred to as electric vehicles are known. However, motor vehicles which comprise both an electric motor and an internal combustion engine to drive the vehicle (referred to as hybrid vehicles) have also been proposed. While in motor vehicles which have only one internal combustion engine the internal combustion engine also "pulls along" all the electric consumers (secondary consumers) which are provided in addition to the drive via the dynamo, this is no longer the case with an electric motor which is operated from a store for electrical energy, in particular a high-voltage battery, since the secondary consumers also contribute to the overall consumption from the electric energy store. Known concepts for calculating a residual range do not sufficiently take into account these secondary consumers in order also to make sufficiently reliable statements about the residual range even in the case of operation of an electric motor.

SUMMARY

One possible object relates to specifying a possible way of determining the residual range more precisely and in a more differentiated fashion.

The inventors propose a method of the type mentioned at the beginning in which
  consumption values which describe the current consumption of the drive and of at least one secondary consumer are determined using at least one sensor,
  at least one drive prediction value which is assigned to the drive and describes the consumption over a predetermined distance is determined from the consumption values of the drive, and
  at least one secondary consumer prediction value which is assigned to the secondary consumers and describes the consumption over a predetermined distance is determined separately from the consumption values of the secondary consumers, and
  the residual range is determined for at least one distance which is to be traveled by the motor vehicle and which is described by route data taking into account the drive prediction value and the secondary consumer prediction value.

During the operation of an electric motor, the secondary consumers which contribute themselves to the consumption can therefore be taken into account separately, that is to say not only is a single prediction value determined (if appropriate for each classification) which describes the total consumption but instead at least two prediction values are determined, specifically a drive prediction value, which relates merely to the drive (specifically the electric motor), and at least one secondary consumer prediction value which attempts to predict consumption of secondary consumers for future route sections. This is based on the realization that the consumption values of the drive and secondary consumers are not always correlated and therefore separate consideration is appropriate in order to enable an ultimately more precise and, in particular, more differentiated calculation of the residual range. A more precise result is obtained overall. It is to be noted here that the method is, of course, carried out automatically within the motor vehicle, in particular by a correspondingly embodied control device.

It is particularly expedient here if the drive prediction value and the secondary consumer prediction value are determined with a different calculation method and/or a differently parameterized calculation method. This therefore means that the differentiated consideration of the drive and of the secondary consumers also takes the form of a different type of calculation of the corresponding prediction values, wherein the calculation methods or the parameterization can be selected in a way which is specifically matched to the secondary consumers and the drive, for example on the basis of empirical investigations. It is therefore conceivable, for example if different classes of ambient conditions and/or route sections are taken into account, to perform a different classification for the drive prediction values and the secondary consumer prediction values. It is also possible to use different filters or filter parameters, more details being given on this below.

In one advantageous refinement it can be provided that the drive prediction value and/or the secondary consumer prediction value are determined by filtering consumption values (the profile of how the consumption values change) using at least one filter. Therefore, ultimately the profile of the different consumption values is considered and analyzed, with the result that a specific history of the consumption values is always also taken into account by filtering, and consequently said history is included in the determination of the prediction values. Determination of the prediction values takes into account, in addition to the current consumption properties, as a function of the selected filter parameters, the consumption behavior (which for the most part is driver-initiated in the case of the secondary consumers) in the relatively recent past. This therefore means that the prediction values are continuously updated on the basis of the current consumption values, with the result that a better prediction is provided for the route sections which are to be traveled along in future.

In this context, it is also to be noted at this point that it is generally advantageous, in particular, to average out fluctuations in the consumption properties, and always to consider the consumption values averaged over a (short) distance, that is to say to form a mean value over 100 m in each case.

In this context PT filters (Proportional Transmission behavior with order 1), in particular PT2 filters (Proportional Transmission behavior with order 2), have proven to be particularly suitable filters, in particular with respect to the secondary consumer prediction value. Of course, other types of filtering are also conceivable, for example sliding mean value filtering or the like.

In one development of the method it is possible that two filters are used to determine the secondary consumer prediction value, wherein a first filter has high attenuation and a second filter has low attenuation, and an, in particular, weighted combination of the filter results is produced. It is therefore conceivable to use different filters to then combine the results. In one particularly advantageous embodiment, the weighting of the filter results can be carried out as a function of the residual energy. This therefore means that it is possible to use various filter characteristics which can then be weighted as a function of an operating parameter, specifically, for example, as a function of the residual energy.

Of course, when using a filter it is also generally possible to provide that at least one filter parameter is selected as a function of an operating parameter of the motor vehicle which is related to the drive, in particular as a function of the residual energy.

These two considerations—weighting the results of various filters as a function of the residual energy or adapting filter parameters as a function of an operating parameter, in particular the residual energy—which have just been mentioned and are particularly advantageous with respect to the secondary consumer prediction value, are based on the idea that, in particular, the residual energy constitutes a relevant criterion when the focus is on the time period which is considered when secondary consumers are used. This is because if the residual energy is already low, that is to say if a corresponding residual range can therefore also be expected to be rather small, current consumption developments during the use of secondary consumers have a relatively large, more relevant influence. If, for example in the case of very low residual energy, an air conditioning system is activated, the prediction value which relates to this secondary consumer should be increased more quickly than if relatively high residual energy is still available, according to which it is thus possible to react quickly to the changed, but highly relevant, situation since in the example of the air conditioning system said system constitutes a completely relevant consumer.

In one particularly preferred embodiment it is possible to provide that at least two secondary consumer prediction values are determined for at least one secondary consumer group comprising at least one secondary consumer. This means a more differentiated consideration is also possible with respect to the different secondary consumers themselves, with the result that, in particular also for such different secondary consumer groups, it is the case that the secondary consumer prediction values of different secondary consumer groups can be determined with different calculation methods and/or differently parameterized calculation methods. For example, differently parameterized filters can be used for determining the secondary consumer prediction values of different secondary consumer groups and the like.

It is therefore possible for example to provide that a secondary consumer group comprises all the secondary consumers which are under consideration and which are connected to an on-board power supply system with a low voltage, and a further secondary consumer group comprises at least one secondary consumer which is connected to an on-board power supply system with a relatively high voltage, in particular at least one secondary consumer which relates to the temperature management within the motor vehicle. Motor vehicles with an electric motor usually have a high-voltage power system and a low-voltage power system, which can be connected via a DC/DC converter. The high-voltage power system is fed by the high-voltage battery, which is also used as an energy store for the electric motor. The low-voltage power system can have a low-voltage battery, for example with an operating voltage of 12 V, wherein, of course, the high voltage is higher than the low voltage. It is then therefore conceivable to consider the low-voltage secondary consumers and the high-voltage secondary consumers separately, with the result that further, more precise differentiation can take place and consequently more precise calculation of the residual range is carried out. In particular, components of an air conditioning system are possible here as high-voltage secondary consumers with a marked influence, which can be considered separately. Generally, devices relating to the temperatures in the motor vehicle can be combined as a thermal management system.

It is also possible to provide that upper limits are used for the prediction values. This can be appropriate to avoid degeneration in various operating states.

In a further refinement it is possible to provide that drive prediction values and/or secondary consumer prediction values which are assigned to specific classes of route sections and/or ambient conditions are determined. In this context it is possible to use, for the drive prediction values, for example the method described by DE 199 29 426 A1 which was already cited at the beginning, wherein route sections are classified and each class is assigned a separate prediction value (consumption mean value in said document). Corresponding data for determining in which class of route sections the current location is, for example a road class, a speed limit, a positive gradient, a bend radius, traffic information and the like, can be supplied by a navigation system. It is also possible here to take into account classes for the secondary consumer prediction values which can also relate, for example, to ambient conditions, for example weather conditions or the like.

In a further refinement it is possible to provide that a control device of a combination display device is used to carry out the method, and/or the route data is made available by a control device of a navigation device. A navigation device can furthermore also supply information on the current location of the motor vehicle, which location can be determined, for example, by data of a GPS sensor and subsequent "map matching". Route data, if appropriate data for classification and the current position of the motor vehicle, are then made available to the control device, which is intended to determine the residual range. This may preferably be a control device of a combination display device on which the residual range is then also to be displayed. Control devices of secondary consumers and of the drive can supply the current consumption values which can be determined, for example, by evaluating measured values of suitable sensors. The remaining residual energy can be made available by a corresponding battery control device, in particular by a battery management system.

If the prediction values are first known, for example, as consumption in kilowatt hours/100 km, the total consumption for various route sections, and therefore also the residual range, can be determined given knowledge of the route to be traveled along in future and by the route data by summing, wherein, if appropriate, classifications are to be taken into account.

In addition to the method, the inventors also propose a motor vehicle, having an energy store for a drive which acts on at least one wheel of the motor vehicle and has an electric motor, and a control device which is designed to carry out the method. The control device can particularly advantageously be here the control device of a combination display device. A navigation system and control devices of secondary consumers and the drive as well as of the energy store can supply further required information for determining the residual range. All the statements relating to the method apply analogously to the motor vehicle with which consequently more differentiated and consequently more precise calculation of the residual range is also possible.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 3 shows various filter characteristics in the form of a response to an input signal.

DETAILED DESCRIPTION OF THE PREFERRED EMBODIMENT

Figure 1:
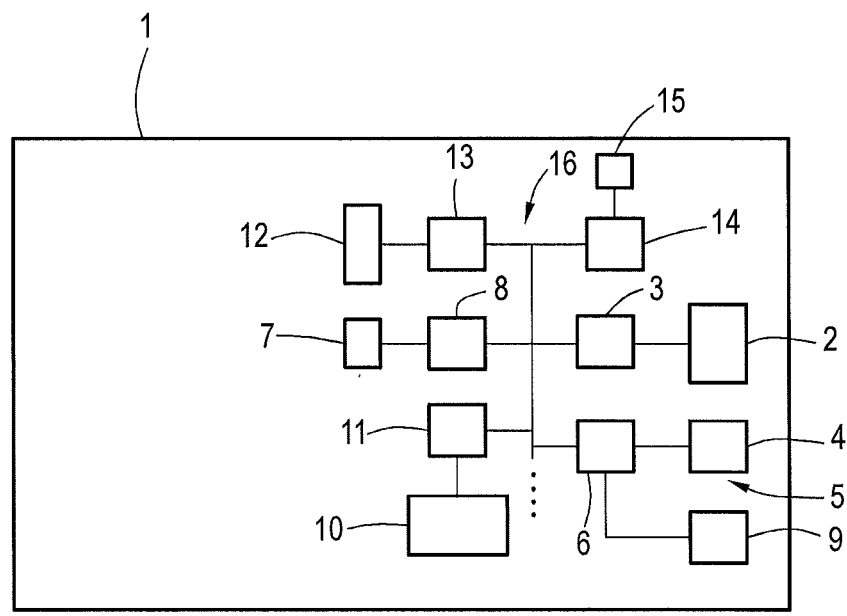
FIG. 1 shows a basic diagram of a proposed motor vehicle.

Reference will now be made in detail to the preferred embodiments of the present invention, examples of which are illustrated in the accompanying drawings, wherein like reference numerals refer to like elements throughout.

FIG. 1 shows a basic diagram of a proposed motor vehicle 1. This is an electric vehicle whose drive comprises an electric motor 2 to which a drive control device 3 is assigned. By a high-voltage power system (not shown in more detail in FIG. 1 for reasons of clarity), the electric motor 2 is supplied with energy by a high-voltage battery 4, which constitutes an electric energy store 5, and said electric motor 2 drives at least one wheel of the motor vehicle 1. A battery control device 6 is also assigned to the high-voltage battery 4.

Components of an air conditioning system 7, to which a control device 8 is also assigned, are also operated by the high-voltage power system.

In addition to the high-voltage power system, in the motor vehicle there is also a low-voltage power system, which is likewise not shown in more detail for reasons of clarity. The low-voltage power system is fed by a low-voltage battery 9, which is also monitored by the battery control device 6, which therefore forms part of a battery management system.

Further secondary consumers, that is to say further consumers of electrical energy, are connected to the low-voltage power system in addition to the electric motor 2 of the drive, wherein purely by way of example an infotainment system 10 with an assigned control device 11 and a combination display device 12 with an assigned control device 13 are shown. In addition, the motor vehicle 1 is also provided with a navigation system 14, to which a GPS sensor 15 is assigned. Of course, further secondary consumers are also conceivable; however, it is to be noted that the control devices 3, 6, 8, 11, 13 themselves also constitute secondary consumers which are operated via the low-voltage power system.

The various control devices and systems of the motor vehicle 1 communicate via a bus system 16, here a CAN bus, as is generally known.

The control device 13 is now designed here to carry out the method. For this purpose, the control device 13 receives various data items about the bus system 16, specifically route data about a route to be traveled along in future and the current position of the motor vehicle 1 from the navigation system 14, information about the residual energy still present in the high-voltage battery 4 from the battery control device 6 and consumption values of the drive and of the secondary consumers, for example from the control devices 3, 8 and 11.

The consumption values are determined here by sensors (not illustrated in more detail in FIG. 1), for example in that the current and voltage at the input of the secondary consumer or electric motor 2 are measured, with the result that the power consumption can be determined. At this point it is also to be noted that the consumption values in the present exemplary embodiment are always considered averaged over a distance of 100 m, which means that a consumption value which is processed by the method relates to the average of a 100 m distance.

Figure 2:
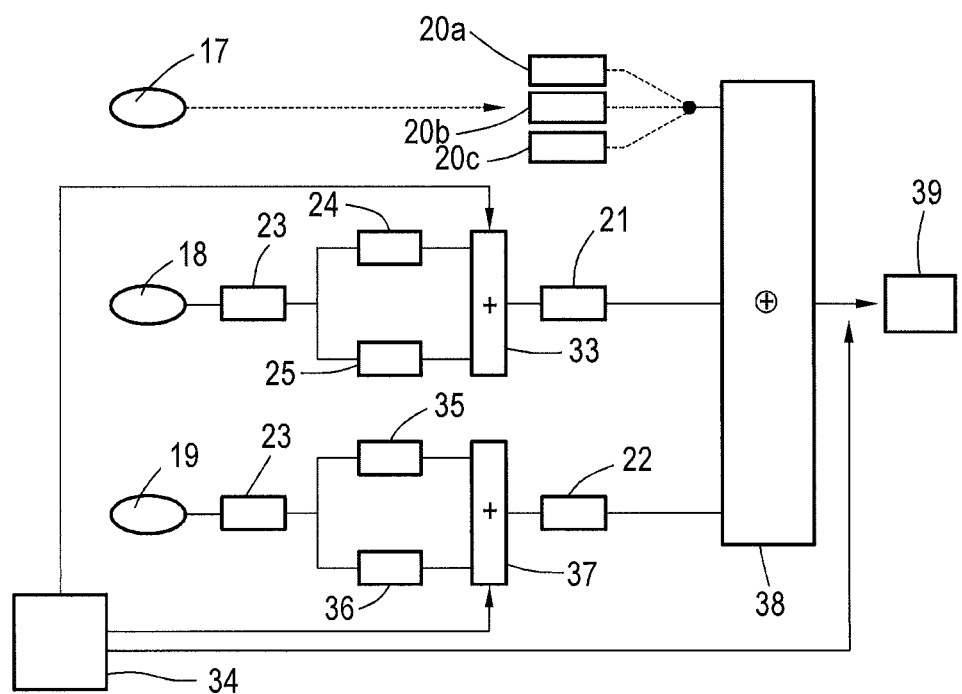
FIG. 2 shows a diagram showing the sequence of the proposed method.

The consumption values are used to continuously update prediction values for the consumption of the drive and of the secondary consumers on a specific route length, 100 km here. This is to be explained in more detail by the illustration in FIG. 2.

In this context the consumption values of the drive are shown as input values at 17, the consumption values of high-voltage secondary consumers, here components of the air conditioning system 7 which are connected to the high-voltage power system, are shown at 18, and consumption values of the other secondary consumers which are connected to the low-voltage power system are shown at 19. It is possible to see the secondary consumers divided into two secondary consumer groups, specifically high-voltage secondary consumers and low-voltage secondary consumers.

Drive prediction values 20*a*, 20*b* and 20*c* are derived from the consumption values 17 of the drive. This is already known in the related art; for example the procedure relating to the consumption mean values as described in DE 199 29 426 A1 can be adopted. The drive prediction values 20*a*, 20*b* and 20*c* are assigned to various classes of route sections, for example "freeway", "country road" and "town traffic". The data of the navigation system 14 make it possible to determine which class the currently recorded consumption values 17 are to be assigned to. At this point it is to be noted that during the determination of secondary consumer prediction values 21, 22, which are determined separately, such classification is also conceivable; however, for the sake of simplicity an example is illustrated herein in which classification in this respect is not performed.

It is important for the method that a different calculation method and/or a differently parameterized calculation method is used for determining the secondary consumer prediction values 21, 22 than for determining the drive prediction values 20*a*, 20*b* and 20*c*. Other filters or filter characteristics can be used.

By way of example, the determination of the secondary consumer prediction value 21 for the secondary consumer group of the high-voltage consumers will firstly be explained in more detail, on the basis of the consumption values 18. The box 23 represents the already described averaging over a specific, short distance, for example 100 m. The averaged consumption value 18 is then fed in parallel to two PT2 filters 24, 25. In this context, the PT2 filters 24, 25 have different attenuation constants, as will be explained in more detail by FIG. 3.

In FIG. 3, firstly a profile of the consumption value plotted against the distance s traveled, consequently a time profile 27, is shown in a first graph 26. At one point 28, there is clearly a jump in consumption, for example after a driver of the motor vehicle 1 has activated the air conditioning system 7 at this point 28.

The graph 29 then shows the profile 30 which is filtered by the filter 24 with a high attenuation constant. The effect of the jump at the point 28 is clearly only extremely slow. In contrast, the profile 32 which is filtered by the filter 25 with a low attenuation constant, and which follows the original profile 27 significantly more quickly, is shown in the graph 31.

The results of the filtering, which also, moreover, define through their parameterization the distances over which the historic consumption values 18 will have an effect, are added in a combiner 33 in a weighted fashion. The weighting takes place here as a function of the residual energy 34 in such a way that in the case of low residual energy levels the result of the filter 25 becomes more relevant, but in the case of high residual energy levels the result of the filter 24 becomes more relevant. This is due to the fact that in the case of low residual energy levels 34, consequently in the case of low residual ranges, short-term changes in consumption can also be very relevant, with the result that it is then possible to react to them more quickly.

The result which is obtained is then the first secondary consumer prediction value 21, which can specify, for example, how high the energy consumption is at 100 km on the basis of the profile of the consumption values 18.

PT2 filters 35 and 36, whose results are correspondingly combined in a combiner 37, are also used for the group of low-voltage consumers, consumption values 19. However, the filters 35 and 36 are parameterized differently than the filters 24 and 25 and the weighting as a function of the residual energy 34 also occurs in a different way, that is to say a differently parameterized calculation method is used. However, at this point it is also to be noted that different calculation methods, for example the use of different filters, can also be provided. Furthermore, the filters 24, 25, 35 and 36 do not have to be PT2 filters, but instead other filters can also be used, for example sliding mean value filters. A calculation method such as has been shown for the consumer prediction values 21 and 22 can, moreover, of course also be used in an analogous fashion, but parameterized differently, for the calculation of the drive prediction values 20*a*, 20*b* and 20*c*.

If the current prediction values 20*a*, 20*b*, 20*c*, 21 and 22 are then known, it is possible to determine a consumption for the route section by adding the corresponding values for a route section, combiner 38, wherein, if appropriate, the class thereof has to be taken into account in the selection of the prediction value 20*a*, 20*b* or 20*c*. Whenever the consumption has been predicted on the basis of the prediction values 20*a*, 20*b*, 20*c*, 21 and 22 for a route section, this consumption is subtracted from the residual energy 34. If this has dropped to zero, or even below zero, on a route section, the residual range 39 is determined for the corresponding route. It can then be displayed, for example, on the combination display device 12.

Finally, it is also to be noted that it can be provided that upper limits are used for the prediction values 20*a*, 20*b*, 20*c*, 21 and 22 in order to avoid incorrect calculations, in particular when there is little data available. In addition, it is to be noted that instead of the weighting in the combiners 33 and 37 it is alternatively or additionally also possible to change the filter parameters of the filters 25, 24, 35 and 36 as a function of the residual energy 34.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for determining a residual range of a motor vehicle, in which the motor vehicle has an energy store for a drive which acts on at least one wheel of the motor vehicle, as a function of residual energy in the energy store, the drive comprising an electric motor, the method comprising:

using at least one processor to:
  determine a drive consumption value, the drive consumption value being indicative of past electric power consumption of the drive;
  determine a secondary consumer consumption value, the secondary consumer consumption value being indicative of an average electric power consumption of a secondary consumer, the secondary consumer comprising an air conditioning system;
  derive a plurality of drive prediction values from the drive consumption value, the drive prediction values relating to an electric power consumption prediction for the drive, each drive prediction value being assigned to a predetermined class of route section;
  derive a secondary consumer prediction value, from the secondary consumer consumption value, the secondary consumer prediction value being determined separately from the drive prediction value, the secondary consumer prediction value relating to an electric power consumption prediction for the secondary consumer, the drive prediction value and the secondary consumer prediction value being determined with different calculation methods and/or differently parameterized calculation methods, the secondary consumer prediction value being adapted to at least one of current ambient conditions and residual energy in the energy store;

obtain route data describing a route to be traveled by the vehicle;

match the route to be travelled with various predetermined classes of route section to select at least one drive prediction value;

calculate the residual range for a distance to be traveled by the motor vehicle, according to route data, using the at least one drive prediction value selected and the secondary consumer prediction value; and update the drive prediction value and the secondary consumer prediction value based on current electric power consumption of the drive and the secondary consumer during the distance traveled by the motor vehicle; and outputting the residual range.

2. A method for determining a residual range of a motor vehicle as a function of residual energy, the motor vehicle having an energy store for a drive which acts on at least one wheel of the motor vehicle, the drive comprising an electric motor, the method comprising:

determining a drive consumption value describing consumption of the drive, the drive consumption value being determined using a first sensor;

determining a secondary consumer consumption value describing consumption of a secondary consumer, the secondary consumer consumption value being determined using a second sensor;

deriving a drive prediction value from the drive consumption value, the drive prediction value relating to an electric power consumption prediction for the drive;

deriving a secondary consumer prediction value from the secondary consumer consumption value, the secondary consumer prediction value relating to an electric power consumption prediction for the secondary consumer, the secondary consumer prediction value being determined separately from the drive prediction value, the drive prediction value and the secondary consumer prediction value being determined with different calculation methods and/or a differently parameterized calculation method;

obtaining route data describing a route to be traveled by the vehicle;

calculating the residual range as an available travel distance for the motor vehicle on a route determined from the route data, using the drive prediction value and the secondary consumer prediction value; and outputting the residual range, wherein the secondary consumer comprises an air conditioning system, and the secondary consumer prediction value is derived by at least one of:

adapting the secondary consumer consumption value to current ambient conditions, and determining an average prior consumption value for the secondary consumer consumption value and adapting the time over which the secondary consumer consumption value is averaged based on residual energy in the energy store.

3. The method according to claim 2, wherein the drive prediction value is determined by filtering the drive consumption value, and/or the secondary consumer prediction value is determined by filtering the secondary consumer consumption value.

4. The method according to claim 3, wherein a filter is used to filter the drive prediction value and/or the secondary consumer prediction value, and the filter is at least one of a PT filter (Proportional Transmission behavior with order 1) and a PT2 filter (Proportional Transmission behavior with order 2).

5. The method according to claim 2, wherein the secondary consumer prediction value is determined by filtering the secondary consumer consumption value using first and second filters, the first filter has high attenuation and produces a first filter result for the secondary consumer consumption value, the second filter has low attenuation and produces a second filter result for the secondary consumer consumption value, and a weighted combination of the first and second filter results is used to produce the secondary consumer prediction value.

6. The method according to claim 5, wherein the weighted combination of the filter results is carried out based on the amount of residual energy.

7. The method according to claim 3, wherein a filter is used to filter the drive prediction value and/or the secondary consumer prediction value, and a filter parameter of the filter is selected based on the amount of residual energy.

8. The method according to claim 2, wherein a first secondary consumer prediction value is determined for a first secondary consumer, and a second secondary consumer prediction value is determined independently from the first secondary consumer prediction value, for a second secondary consumer.

9. The method according to claim 8, wherein the first secondary consumer comprises secondary consumers connected to a low voltage on-board power supply system, and the second secondary consumer comprises a temperature management system connected to a high voltage on-board power supply system, to regulate temperature within the motor vehicle.

10. The method according to claim 2, wherein maximum consumption values are used for the prediction values when insufficient consumption value data is available, and the prediction values are determined from the consumption values when sufficient consumption value data is available.

11. The method according to claim 2, wherein the drive consumption value is used to determine a plurality of drive prediction values, each drive prediction value being assigned to a predetermined class of route section, and the secondary consumer prediction value is produced by determining an average prior consumption value for the secondary consumer consumption value and adapting the time over which the secondary consumer consumption value is averaged based on residual energy in the energy store.

12. The method according to claim 11, wherein
the secondary consumer consumption value is averaged over a shorter time when the residual energy in the energy store is lower.

13. The method according to claim 11, wherein
the secondary consumer consumption value is used to determine a plurality of average prior consumption values for the secondary consumer,
each average prior consumption value is classified according to a prior ambient condition, and
a current ambient condition is matched to a prior ambient condition to select a relevant prior average consumption value to calculate the residual range of the motor vehicle.

14. The method according to claim 2, wherein
a plurality of drive prediction values are derived from the drive consumption value, each drive prediction value being assigned to a different class of route section.

15. The method according to claim 14, wherein
the route sections are classified based on at least one of a speed limit, a bend radius, a state of charge of the energy store, a positive gradient, a negative gradient and traffic conditions.

16. The method according to claim 14, wherein
to calculate the residual range for the motor vehicle on the route, the route is classified and matched with at least one drive prediction value, which is combined with the secondary consumer prediction value.

17. The method according to claim 3, wherein
the drive prediction value and the secondary consumer prediction value are continuously updated based on the current consumption of the drive and the secondary consumer on a specific route length.

18. A motor vehicle, comprising:
an energy store for a drive acting on at least one wheel of the motor vehicle;
an electric motor; and
a control device to:
  determine a drive consumption value describing consumption of the drive, the drive consumption value being determined using a first sensor;
  determine a secondary consumer consumption value describing consumption of a secondary consumer, the secondary consumer consumption value being determined using a second sensor;
  derive a drive prediction value from the drive consumption value, the drive prediction value relating to an electric power consumption prediction for the drive;
  derive a secondary consumer prediction value from the secondary consumer consumption value, the secondary consumer prediction value relating to an electric power consumption prediction for the secondary consumer, the secondary consumer prediction value being determined separately from the drive prediction value, the drive prediction value and the secondary consumer prediction value being determined with different calculation methods and/or a differently parameterized calculation method;
  obtain route data describing a route to be traveled by the vehicle; and
  calculate the residual range as an available travel distance for the motor vehicle on a route determined from the route data, using the drive prediction value and the secondary consumer prediction value, wherein
the secondary consumer comprises an air conditioning system, and
the secondary consumer prediction value is derived by at least one of:
  adapting the secondary consumer consumption value to current ambient conditions, and
  determining an average prior consumption value for the secondary consumer consumption value and adapting the time over which the secondary consumer consumption value is averaged based on residual energy in the energy store.

19. The motor vehicle according to claim 18, wherein
the route data is obtained by a navigation system, and
the control device is a control device of a combination display device.

* * * * *

UNITED STATES PATENT AND TRADEMARK OFFICE
CERTIFICATE OF CORRECTION

PATENT NO. : 9,662,996 B2  
APPLICATION NO. : 14/233190  
DATED : May 30, 2017  
INVENTOR(S) : Michael Klimesch et al.

Page 1 of 1

It is certified that error appears in the above-identified patent and that said Letters Patent is hereby corrected as shown below:

On the Title Page  
Item [75] (Inventors)  
Column 1, Line 7-8, Delete "Neuberg a.d. Donau" and insert -- Neuburg a.d. Donau --, therefore.

In the Claims  
Column 8, Line 62, In Claim 1, delete "value, from" and insert -- value from --, therefore.

Signed and Sealed this  
Twenty-sixth Day of December, 2017

Joseph Matal  
*Performing the Functions and Duties of the*  
*Under Secretary of Commerce for Intellectual Property and*  
*Director of the United States Patent and Trademark Office*